United States Patent
Rheaume et al.

(10) Patent No.: US 10,874,980 B2
(45) Date of Patent: Dec. 29, 2020

(54) INERT GAS GENERATING SYSTEM

(71) Applicant: Hamilton Sundstrand Corporation, Charlotte, NC (US)

(72) Inventors: Jonathan Rheaume, West Hartford, CT (US); Haralambos Cordatos, Colchester, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 320 days.

(21) Appl. No.: 15/673,022

(22) Filed: Aug. 9, 2017

(65) Prior Publication Data
US 2019/0046924 A1 Feb. 14, 2019

(51) Int. Cl.
| | |
|---|---|
| *B01D 53/22* | (2006.01) |
| *B64D 37/32* | (2006.01) |
| *A62C 3/08* | (2006.01) |
| *A62C 99/00* | (2010.01) |
| *B01D 53/04* | (2006.01) |
| *B01D 53/047* | (2006.01) |
| *B01D 53/14* | (2006.01) |
| *B01D 53/75* | (2006.01) |

(Continued)

(52) U.S. Cl.
CPC ............ *B01D 53/229* (2013.01); *A62C 3/002* (2013.01); *A62C 3/08* (2013.01); *A62C 99/0018* (2013.01); *B01D 53/047* (2013.01); *B01D 53/0462* (2013.01); *B01D 53/1475* (2013.01); *B01D 53/228* (2013.01); *B01D 53/261* (2013.01); *B01D 53/268* (2013.01); *B01D 53/75* (2013.01); *B01D 53/864* (2013.01); *B64D 37/32* (2013.01); *B64D 45/00* (2013.01); *B65D 90/44* (2013.01); *C01B 21/0494* (2013.01); *A62C 3/065* (2013.01); *B01D 2053/221* (2013.01); *B01D 2257/504* (2013.01); *B01D 2257/80* (2013.01); *B64D 2045/009* (2013.01); *C01B 2210/0004* (2013.01); *C01B 2210/0012* (2013.01); *C01B 2210/0045* (2013.01); *C01B 2210/0051* (2013.01)

(58) Field of Classification Search
None
See application file for complete search history.

(56) References Cited

U.S. PATENT DOCUMENTS

| | | | |
|---|---|---|---|
| 7,628,965 | B2 | 12/2009 | Johnson et al. |
| 7,694,916 | B2 | 4/2010 | Limaye et al. |

(Continued)

FOREIGN PATENT DOCUMENTS

EP 2520493 A2 11/2012

OTHER PUBLICATIONS

Extended European Search Report for EP Application No. 18188089.9, dated Jan. 7, 2019, 7 pages.

*Primary Examiner* — Philip Y Louie
(74) *Attorney, Agent, or Firm* — Kinney & Lange, P. A.

(57) ABSTRACT

A gas inerting system employs a carbon dioxide separation unit to remove carbon dioxide and water from an oxygen depleted gas stream generated from a catalytic oxidation unit and subsequently provides a nitrogen rich inerting gas to a fuel tank and/or to a cargo hold. A method of producing an inert gas passes an oxygen depleted gas stream from a catalytic oxidation unit through a carbon dioxide separation unit and provides a nitrogen rich inerting gas for fuel tank inerting and/or cargo hold fire suppression.

14 Claims, 4 Drawing Sheets

(51) Int. Cl.
    *B01D 53/26*    (2006.01)
    *B65D 90/44*    (2006.01)
    *B01D 53/86*    (2006.01)
    *A62C 3/00*     (2006.01)
    *B64D 45/00*    (2006.01)
    *C01B 21/04*    (2006.01)
    *A62C 3/06*     (2006.01)

(56) References Cited

U.S. PATENT DOCUMENTS

| | | |
|---|---|---|
| 7,896,292 B2 | 3/2011 | Limaye et al. |
| 7,905,259 B2 | 3/2011 | Johnson et al. |
| 7,964,020 B2 * | 6/2011 | Baker .................... B01D 53/22 |
| | | 60/274 |
| 8,685,149 B2 | 4/2014 | Uchida |
| 8,758,491 B2 | 6/2014 | Guo et al. |
| 8,828,344 B2 | 9/2014 | K-WLam et al. |
| 9,096,326 B2 | 8/2015 | Dooley et al. |
| 9,242,206 B2 | 1/2016 | Okada et al. |
| 9,527,747 B2 | 12/2016 | Wright et al. |
| 2008/0107571 A1 | 5/2008 | Johnson et al. |
| 2008/0128048 A1 | 6/2008 | Johnson et al. |
| 2010/0077921 A1 | 4/2010 | Haggerty et al. |
| 2010/0147148 A1 * | 6/2010 | Rabiei .................... B01D 53/22 |
| | | 95/247 |
| 2011/0290112 A1 * | 12/2011 | Liu ....................... B01D 53/228 |
| | | 95/54 |

\* cited by examiner

INERT GAS GENERATING SYSTEM

BACKGROUND

Fuel tanks may contain potentially combustible combinations of oxygen, fuel vapors, and ignition sources. In order to decrease the risk of combustion in aircraft fuel tanks, commercial aviation regulations require actively managing the risk of explosion in the ullage of fuel tanks. One method is to decrease the oxygen partial pressure in the ullage to less than 12%. Relatedly, fire suppression systems, such as those deployed in aircraft cargo holds, use halogenated compounds to prevent or suppress combustion and/or fire. However, halogenated compounds are known to decrease the amount of ozone in the Earth's atmospheric ozone layer. Inert air may be used instead of these halogenated compounds for fire prevention and suppression.

Currently, many On-Board Inert Gas Generation Systems (OBIGGS) use bleed air and pressurized hollow fiber membranes to produce inert gas for fuel tank ullages. In hollow fiber membranes, the diffusivity of nitrogen is less than the diffusivity of oxygen and water vapor. Hollow fiber membrane systems require pressurized air to drive the separation of oxygen and water from nitrogen in an air stream. However, the pressure of bleed air extracted from an aircraft engine compressor varies throughout a mission, which affects inert gas production quantity and quality as defined by oxygen partial pressure. Furthermore, aircraft design is trending toward lower pressure bleed systems and increasingly electric power distribution architectures. Accordingly, the use of high pressure, hollow fiber membrane inerting systems may not be adequate for these new design systems.

Other approaches utilize catalytic reactors to produce inert gas from ullage space fuel vapors or from liquid fuel. The ullage space, however, may not always contain a sufficient amount of fuel vapors to provide enough inert gas to reduce the amount of oxygen present in the ullage space below 12%, especially when an aircraft is flying at cruise altitude. Thus, a system capable of maintaining a safe oxygen partial pressure in the ullage throughout the entire flight envelope is desired. Additionally, the ability to provide an inerting gas for fire suppression in the cargo hold during the entire flight envelope is desirable.

SUMMARY

This application relates generally to the field of gas inerting systems. Specifically, this invention is a gas inerting system which includes a fuel tank, a catalytic oxidation unit, a carbon dioxide separation unit downstream of the catalytic oxidation unit, and an inerting location.

A method of gas inerting includes receiving a gas stream into a carbon dioxide separation unit from a catalytic oxidation unit, decreasing an amount of carbon dioxide in the gas stream, and providing a nitrogen enriched inerted gas stream to an inerting location.

DETAILED DESCRIPTION

The present disclosure relates to inert gas generating systems and methods of generating inert gas through catalytic oxidation. Although catalytic oxidation results in a decrease of oxygen present in a gas stream, it concomitantly increases the amount of carbon dioxide and water present. The presence of carbon dioxide in an inerting gas to stablize or passivate fuel is not desirable. Carbon dioxide is approximately ten times more soluble in Jet A fuel at 20° C. than nitrogen. Carbon dioxide becomes less soluble in Jet A fuel as temperature is increased (in contrast to nitrogen). As a result, the common practice of using fuel as a heat sink for thermal management on an aircraft may release carbon dioxide gas in the fuel system, creating pockets of carbon dioxide as it travels through the fuel system which may result in cavitation or vapor lock.

While some water may be tolerated in an inerting gas when used in a fire suppression system, water should be removed from an inerting gas when used either to stabilize or passivate a fuel tank. Water in fuel may freeze and the resulting ice may occlude fluidic passages in the fuel system. Water in fuel may also combine with carbon dioxide dissolved in fuel to form carbonic acid, which corrodes fuel system components. Water also encourages the growth of microbes in the fuel which turns the fuel into sludge and generates metabolic byproducts that induce corrosion.

Additionally, animals may be present in the cargo hold and they may not be able to tolerate elevated levels of carbon dioxide. Therefore, the removal of carbon dioxide from a gas inerting stream is desirable before being employed as either a fuel tank inerting gas or as a fire suppression gas in a cargo hold. The present invention achieves the removal of carbon dioxide and water by passing the inerting gas stream provided by the catalytic oxidation unit over a membrane, resulting in a nitrogen enriched inerted gas stream.

Figure 1:
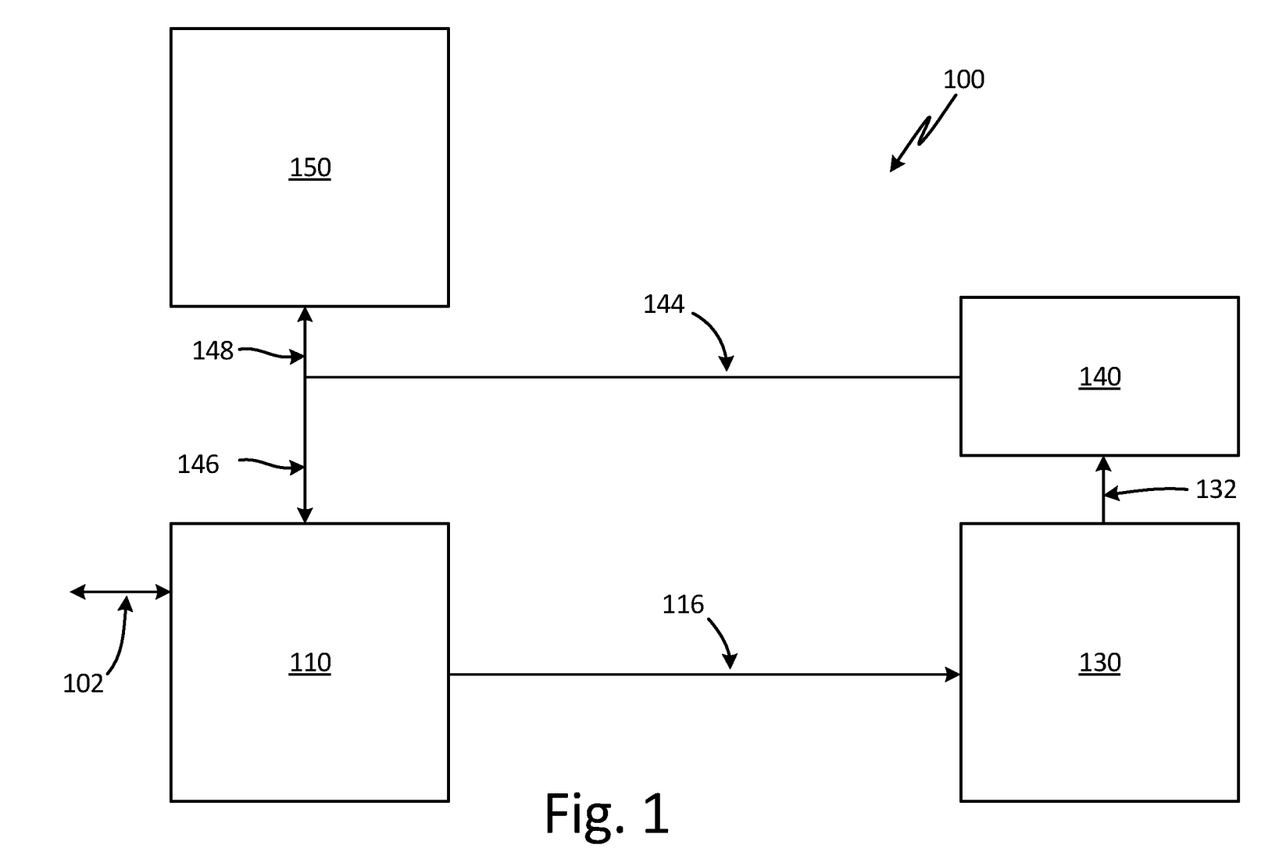
FIG. 1 is a schematic view of an exemplary embodiment of an inert gas generating system.

FIG. 1 is a schematic view of inert gas generating system 100. System 100 includes fuel tank 110, catalytic oxidation unit 130, and carbon dioxide separation unit 140. Fuel tank 110 may be in communication with outside air via vent 102. Vent 102 may provide a source of oxygen throughout the entire flight envelope to fuel tank 110. In one embodiment fuel tank 110 provides fuel via fuel stream 116 to catalytic oxidation unit 130. The provided fuel may be in the form of either fuel vapor or liquid fuel. The provided fuel reacts with oxygen in the presence of a catalyst in catalytic oxidation unit 130. For example, the catalyst used in the reaction may comprise, for example, noble metals, precious metals, transition metals, metal oxides, rare earth oxides, nitrides, carbides, enzymes, or any other suitable catalytic material and combinations thereof.

Oxygen depleted gas stream 132, made up primarily of nitrogen, carbon dioxide and water, is produced by catalytic oxidation unit 130. Oxygen depleted gas stream 132 is fed into carbon dioxide separation unit 140. Carbon dioxide separation unit 140 separates carbon dioxide and water from oxygen depleted gas stream 132 resulting in nitrogen enriched inerted gas stream 144. Nitrogen enriched inerted gas stream, as used herein, means a gas stream having a nitrogen concentration of greater than 78.1% by volume. In one embodiment, nitrogen enriched inerted gas stream 144 may have a nitrogen concentration of greater than 85%. In another embodiment, nitrogen enriched inerted gas stream 144 may have a nitrogen concentration of greater than 91%.

In another embodiment, nitrogen enriched inerted gas stream 144 may have a nitrogen concentration of greater than 95%. In another embodiment, nitrogen enriched inerted gas stream 144 may have a nitrogen concentration of greater than 99%. Nitrogen enriched inerted gas stream 144 may be provided to fuel tank 110 through gas stream 146. Nitrogen enriched inerted gas stream 144 may be provided to cargo hold 150 through gas stream 148. Nitrogen enriched inerted gas stream 144 may be provided to both fuel tank 110 through gas stream 146 and to cargo hold 150 through gas stream 148.

Figure 2:
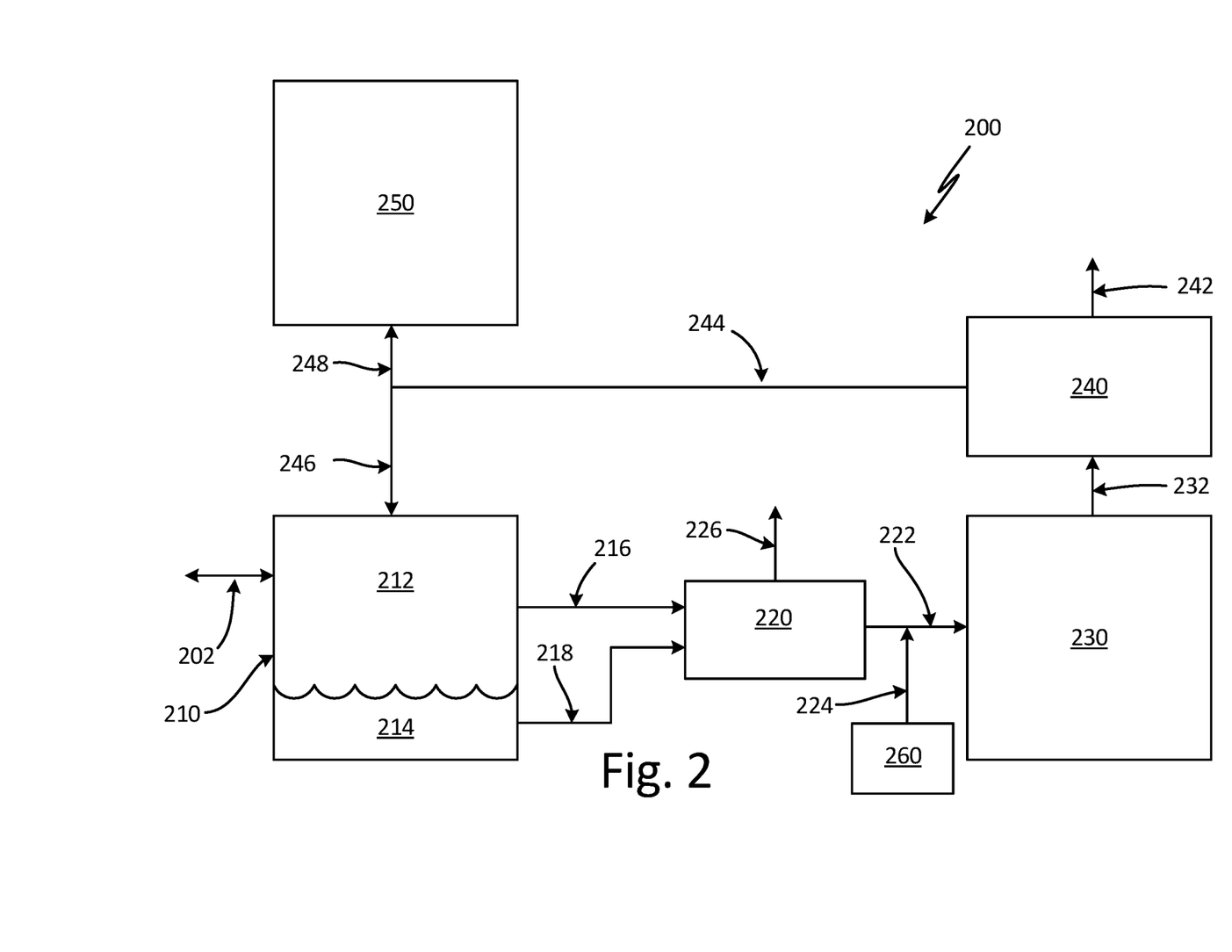
FIG. 2 is a schematic view of another exemplary embodiment of an inert gas generating system.

FIG. 2 is a schematic view of alternate embodiment inert gas generating system 200. System 200 includes fuel tank 210, fuel separation unit 220, catalytic oxidation unit 230, carbon dioxide separation unit 240, and cargo hold 250. Fuel tank 210 is in communication with the outside air via vent 202. Vent 202 may provide a source of oxygen throughout the entire flight envelope to fuel tank 210. Fuel tank 210 provides fuel to fuel separation unit 220. Fuel separation unit 220 separates fuel vapor from ullage 212 into concentrated fuel vapor stream 222 and gas stream 226. Concentrated fuel vapor stream 222 may be more concentrated relative to the amount of fuel vapor present in ullage 212 on a per cubic centimeter of gas basis. Concentrated fuel vapor stream 222 is provided to catalytic oxidation unit 230. Gas stream 226, primarily made up of nitrogen and oxygen, may be employed for other uses, for example, gas stream 226 may be combined with other inerting gas streams for use in inerting fuel tank 210 or fire suppression in cargo hold 250. In another embodiment, gas stream 226 may be vented to outside air.

Fuel separation unit 220 may accept fuel vapor stream 216 from ullage 212 of fuel tank 210. Fuel vapor separation by fuel separation unit 220 may be achieved by membrane separation through the use of a sweep gas or a vacuum source, for example. The vacuum source may be, for example, an ejector, a diaphragm vacuum pump, scroll pump, or other suitable pump. Fuel vapor separation may also be achieved through condensation of the fuel vapor. Because the demand for inerting gas may be greater than the amount of fuel vapor present in ullage 212 when an aircraft is flying at cruise altitude, several ways to further regulate the amount of fuel vapor produced from ullage 212 are contemplated. For example, additional fuel vapor may be provided through the addition of a heat source, such as a heating element or a recuperating heat exchanger. The temperature and flow rate of a sweep gas may also be varied to control fuel vapor production from ullage 212.

Fuel separation unit 220 may accept liquid fuel stream 218 from liquid fuel 214 in fuel tank 210. The amount of liquid fuel 214 provided to fuel separation unit 220 may be varied such that a desired amount of inert gas is generated during the entire flight envelope. This may be accomplished, for example, by placing an actuated valve downstream of a fuel pump, both located in-line with liquid fuel stream 218. Fuel separation unit 220 separates the fuel vapor from liquid fuel stream 218 into concentrated fuel vapor stream 222 and gas stream 226. Any remaining unevaporated liquid fuel may be returned to fuel tank 210 or provided to the main fuel system for combustion (not shown). Concentrated fuel vapor stream 222 is provided to catalytic oxidation unit 230. Gas stream 226, primarily made up of nitrogen and oxygen, may be employed for other uses, for example, gas stream 226 may be combined with other inerting gas streams for use in inerting fuel tank 210 or fire suppression in cargo hold 250. In another embodiment, gas stream 226 may be vented to outside air.

In one embodiment, fuel separation unit 220 is configured to selectively permeate species having smaller molecular diameters, which facilitates the production of substantially sulfur-free vapor fractions. Substantially sulfur-free, as used herein, means sulfur containing hydrocarbons make up significantly less than 0.3% of the total hydrocarbons present by mass. Sulfur can poison certain types of catalysts which may be present in catalytic oxidation unit 230. One or more fuel separation units 220 may accept fuel from both fuel vapor stream 216 and liquid fuel stream 218.

Catalytic oxidation unit 230 accepts fuel vapor from concentrated fuel vapor stream 222 which is primarily made up of nitrogen, fuel vapor, and oxygen. Catalytic oxidation unit 230 uses oxygen as an oxidizing agent to oxidize fuel vapor from concentrated fuel vapor stream 222. The resulting products are primarily carbon dioxide and water. Primarily, as used herein, means more than 50% of the reactants or products by mass are in the form of fuel vapor and oxygen or carbon dioxide and water, respectively. Any unreacted gases present in concentrated fuel vapor stream 222 or oxygen depleted gas stream 232, such as nitrogen, are not considered a reactant or product herein. The resulting products along with nitrogen, which is passed through catalytic oxidation unit 230, are provided to oxygen depleted gas stream 232. Oxygen depleted gas stream 232 is provided to carbon dioxide separation unit 240.

Catalytic oxidation unit 230 may further comprise a catalyst. For example, the catalyst used in the reaction may comprise, for example, noble metals, precious metals, transition metals, metal oxides, rare earth oxides, nitrides, carbides, enzymes, or any other suitable catalytic material and combinations thereof. The catalytic oxidation unit 230 may further comprise combustion air source 260. In order to provide sufficient quantities of inert air for fuel tank inerting and cargo hold fire suppression, the catalytic oxidation reaction should be controlled. Not only may additional fuel need to be supplied as described above, but additional oxygen from combustion air source 260 may also need to be provided.

The amount of oxygen present in ullage 212 may vary during the flight envelope. For example, there may not be enough oxygen present in ullage 212 to produce enough inerted gas to suppress a fire when an aircraft is flying at cruise altitude. Combustion air source 260 may provide additional oxygen to catalytic oxidation unit 230 through combustion air source stream 224. Combustion air source 260 may be any type of air source, for example, outside air, ambient air, ram air, fan air, engine bleed air, or cabin air may be used. One or more sensors may be employed either upstream or downstream of catalytic oxidation unit 230. The one or more sensors may monitor, for example, one or more of the reactants such as the amount of hydrocarbons or the amount of oxygen present, or the one or more sensors may monitor one or more of the products such as the amount of carbon dioxide or the amount of water present, or the one of more sensors may monitor the flow rate of one or more of the gas streams in the system for optimization of providing inerting gases or the one or more sensors may monitor temperature or pressure or any other useful parameter or any combination thereof.

Carbon dioxide separation unit 240 accepts gas from oxygen depleted gas stream 232. Carbon dioxide separation unit 240 separates carbon dioxide and water from nitrogen gas. The carbon dioxide and water may be provided to carbon dioxide stream 242. Carbon dioxide stream 242 may be vented to the outside air. The separated nitrogen gas is provided to the nitrogen enriched inerted gas stream 244.

Nitrogen enriched inerted gas stream, as used herein, means a gas stream having a nitrogen concentration of greater than 78.1% by volume. In one embodiment, nitrogen enriched inerted gas stream 244 may have a nitrogen concentration of greater than 85%. In another embodiment, nitrogen enriched inerted gas stream 244 may have a nitrogen concentration of greater than 91%. In another embodiment, nitrogen enriched inerted gas stream 244 may have a nitrogen concentration of greater than 95%. In another embodiment, nitrogen enriched inerted gas stream 244 may have a nitrogen concentration of greater than 99%. Nitrogen enriched inerted gas stream 244 may be provided to fuel tank 210 through gas stream 246. Nitrogen enriched inerted gas stream 244 may be provided to cargo hold 250 through gas stream 248. Nitrogen enriched inerted gas stream 244 may be provided to both fuel tank 210 through gas stream 246 and to cargo hold 250 through gas stream 248. Gas stream 246 may be introduced into fuel tank 210 through ullage 212 to passivate fuel tank 210. Gas stream 246 may be introduced into fuel tank 210 through liquid fuel 214. In other words, gas stream 246 may be bubbled or sparged through liquid fuel 214 to stabilize liquid fuel 214 with nitrogen enriched inerted gas.

Figure 3:
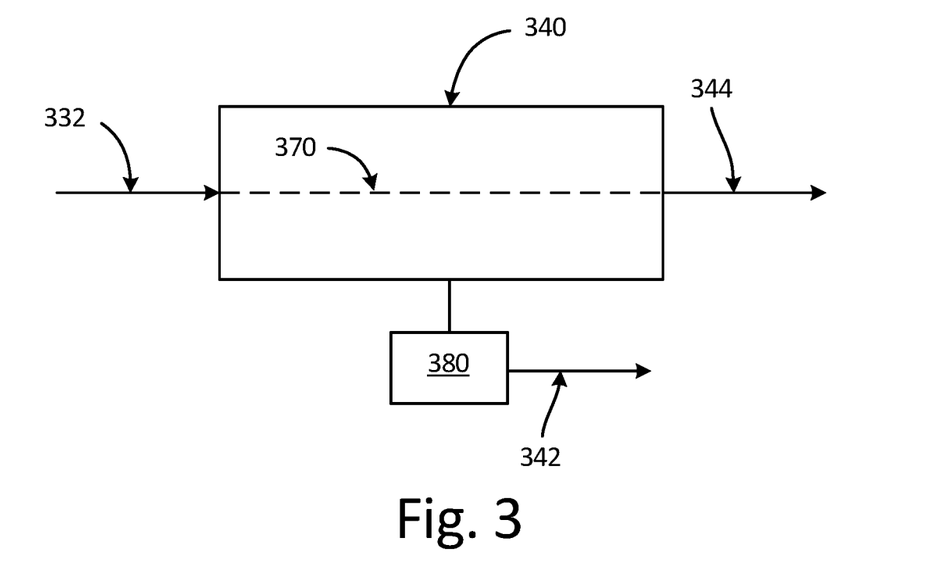
FIG. 3 is a schematic view of an exemplary embodiment of a carbon separation unit.

FIG. 3 is a schematic view of carbon dioxide separation unit 340. In one embodiment, carbon dioxide separation unit 140 in inert gas generating system 100 (shown in FIG. 1) may have the configuration of carbon dioxide separation unit 340. In another embodiment carbon dioxide separation unit 240 may have the configuration of carbon dioxide separation unit 340 in inert gas generating system 200 (shown in FIG. 2). Carbon dioxide separation unit 340 accepts gas from oxygen depleted gas stream 332. Carbon dioxide separation unit 340 separates carbon dioxide and water from nitrogen gas. The carbon dioxide and water is provided to carbon dioxide stream 342. Carbon dioxide stream 342 may be vented to the outside air. The separated nitrogen gas is provided to nitrogen enriched inerted gas stream 344.

In one embodiment carbon dioxide separation unit 340 further comprises membrane 370. Membrane 370 may be formed of various materials such as, for example, polyether-polyamide block copolymer (PEBAX), polyphenylene oxide (PPO), polyimide, polydimethylphenylene oxide, polysulfone, polyethersulfone, poly(4-vinylpyridine)/polyetherimide, polyacrylonitrile with poly(ethylene glycol), poly(amide-6-b-ethylene oxide), poly-vinilydene fluoride (PVDF), and any other material which preferentially transports carbon dioxide across membrane 370 relative to nitrogen, and combinations thereof. Carbon dioxide is transported across membrane 370 at a greater rate than nitrogen. Water may also be transported across membrane 370 at a greater rate than nitrogen. Both carbon dioxide and water may be transported across membrane 370 at a greater rate than nitrogen. Membrane 370 may have a planar geometry. Alternatively, membrane 370 may have a spiral wound, hollow fiber, or other suitable configuration.

Vacuum source 380 may be placed in-line with carbon dioxide stream 342 to maintain a partial pressure gradient of carbon dioxide across membrane 370 to facilitate carbon dioxide transport. Vacuum source 380 may be, for example, an ejector, a diaphragm vacuum pump, scroll pump, or other suitable pump, or combination thereof. The ejector may comprise a single stage or comprise multiple stages. Compressed air is provided to the ejector. Compressed air may be provided by any type of air source, for example, outside air, ambient air, ram air, fan air, engine bleed air, or cabin air. Fluid-free vacuum pumps, which operate without an operating fluid such as oil, may be used to reduce the risk of membrane fouling and reduce maintenance costs by obviating regular oil changes. Fluid-free vacuum pumps are, for example, a diaphragm vacuum pump or scroll pump.

Figure 4:
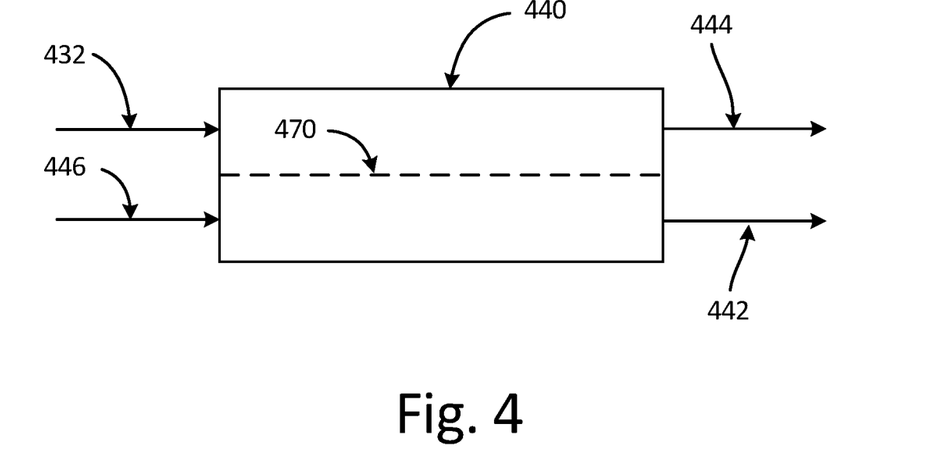
FIG. 4 is a schematic view of another exemplary embodiment of a carbon separation unit.

FIG. 4 is a schematic view of carbon dioxide separation unit 440. In one embodiment, carbon dioxide separation unit 140 in inert gas generating system 100 (shown in FIG. 1) may have the configuration of carbon dioxide separation unit 440. In another embodiment carbon dioxide separation unit 240 may have the configuration of carbon dioxide separation unit 440 in inert gas generating system 200 (shown in FIG. 2). Carbon dioxide separation unit 440 accepts gas from oxygen depleted gas stream 432. Carbon dioxide separation unit 440 separates carbon dioxide and water from nitrogen gas. The carbon dioxide and water may be provided to carbon dioxide stream 442. Carbon dioxide stream 442 may be vented to the outside air. The separated nitrogen gas is provided to the nitrogen enriched inerted gas stream 444.

In one embodiment, carbon dioxide separation unit 440 may further comprise membrane 470. Membrane 470 may be formed of various materials such as, for example, polyether-polyamide block copolymer (PEBAX), polyphenylene oxide (PPO), polyimide, polydimethylphenylene oxide, polysulfone, polyethersulfone, poly(4-vinylpyridine)/polyetherimide, polyacrylonitrile with poly(ethylene glycol), poly(amide-6-b-ethylene oxide), poly-vinilydene fluoride (PVDF), and any other material which preferentially transports carbon dioxide across membrane 370 relative to nitrogen, and combinations thereof. Carbon dioxide is transported across membrane 470 at a greater rate than nitrogen. Water may be transported across membrane 470 at a greater rate than nitrogen. Both carbon dioxide and water may be transported across membrane 470 at a greater rate than nitrogen. Membrane 470 may have a planar geometry. Alternatively, membrane 470 may have a spiral wound, hollow fiber, or other suitable configuration.

Sweep gas stream 446 may be employed to maintain a partial pressure gradient of carbon dioxide across membrane 470. Sweep gas stream 446 may originate from any type of air source such as, for example, outside air, ambient air, ram air, fan air, engine bleed air, conditioned air, cabin air, or cabin outflow air. Sweep gas stream 446 may further comprise a thermal management system.

Figure 5:
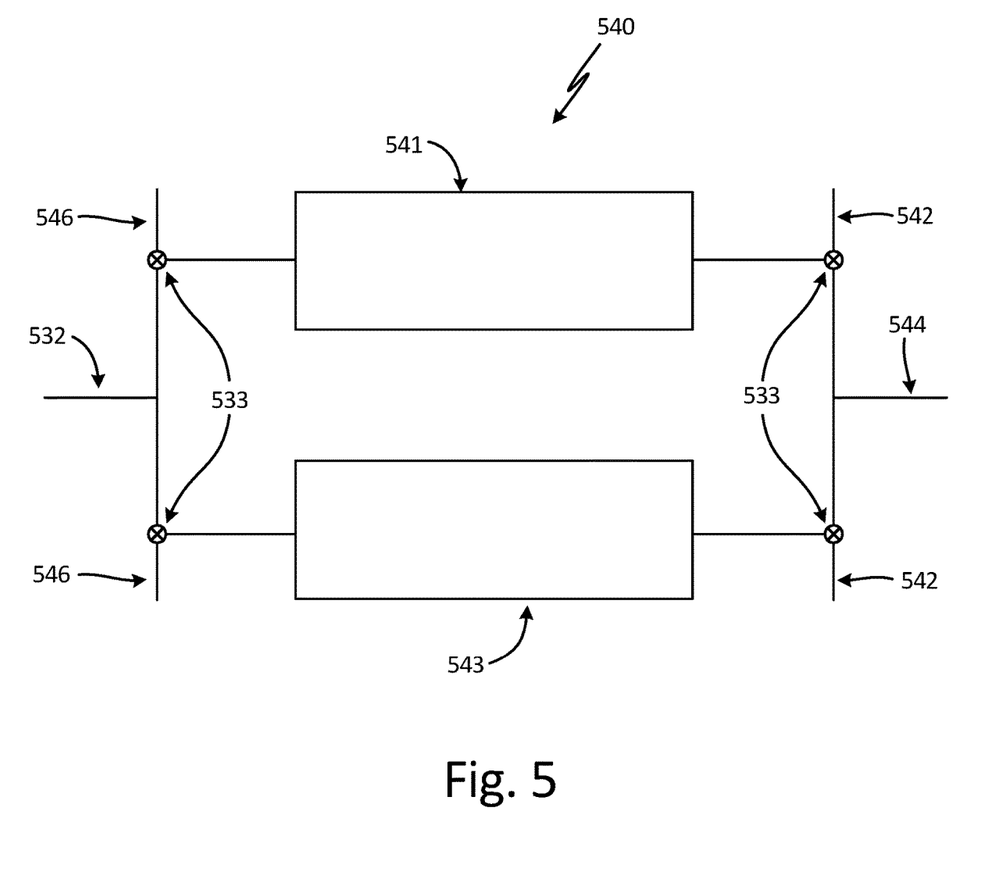
FIG. 5 is a schematic view of another exemplary embodiment of a carbon separation unit.

FIG. 5 is a schematic view of carbon dioxide separation unit 540. In one embodiment, carbon dioxide separation unit 140 in inert gas generating system 100 (shown in FIG. 1) may have the configuration of carbon dioxide separation unit 540. In another embodiment carbon dioxide separation unit 240 may have the configuration of carbon dioxide separation unit 540 in inert gas generating system 200 (shown in FIG. 2). Carbon dioxide separation unit 540 is a pressure-swing or temperature-swing adsorption system. Carbon dioxide separation unit 540 accepts gas from oxygen depleted gas stream 532. Carbon dioxide separation unit 540 separates carbon dioxide and water from nitrogen gas by passing oxygen depleted gas stream 532 over first tank 541 where carbon dioxide and water are preferentially adsorbed allowing nitrogen enriched inerted gas stream 544 to be generated. Once first tank 541 is saturated with carbon dioxide and water, valves 533 are turned such that first tank 541 no longer receives oxygen depleted gas stream 532 and instead oxygen depleted gas stream 532 is passed over second tank 543 where carbon dioxide and water are preferentially adsorbed allowing a nitrogen enriched inerted gas stream 544 to be generated. While second tank 543 is in use, first tank 541 is provided a regenerative gas stream 546 which either increases the pressure, the temperature, or both to regenerate first tank 541. First tank 541 provides carbon dioxide and water during the regenerative process. The carbon dioxide and water may be provided to carbon dioxide stream 542. Carbon dioxide stream 542 may be vented to the outside air. This cycle may be repeated to continuously generate a nitrogen enriched inerted gas stream.

Discussion of Possible Embodiments

The following are non-exclusive descriptions of possible embodiments of the present invention.

A system for inerting gas includes a fuel tank, a catalytic oxidation unit, a carbon dioxide separation unit downstream of the catalytic oxidation unit, and an inerting location.

The system of the preceding paragraph can optionally include, additionally and/or alternatively, any one or more of the following features, configurations and/or additional components:

The carbon dioxide separation unit includes a membrane.

The membrane has a configuration selected from the group consisting of a planar geometry, spiral wound, hollow fiber, and combinations thereof.

The membrane is formed of a at least one material selected from the group consisting of polyether-polyamide block copolymer (PEBAX), polyphenylene oxide (PPO), polyimide, polydimethylphenylene oxide, polysulfone, polyethersulfone, poly(4-vinylpyridine)/polyetherimide, polyacrylonitrile with poly(ethylene glycol), poly(amide-6-b-ethylene oxide), poly-vinilydene fluoride (PVDF), and mixtures thereof.

The carbon dioxide separation unit includes a partial pressure differential source in flow communication with the membrane.

The partial pressure differential source includes a vacuum pump.

The partial pressure differential source includes an ejector.

The partial pressure differential source includes a sweep gas.

The inerting location is a fuel tank.

The inerting location is a cargo hold.

The catalytic oxidation unit is selected from the group consisting of a pressure-swing adsorption system, a temperature-swing adsorption system, and combinations thereof.

The system includes a fuel separation unit upstream of the catalytic oxidation unit wherein the fuel separation unit is in flow communication with the fuel tank and the catalytic oxidation unit.

The fuel separation unit is configured to receive fuel vapors from the fuel tank.

The fuel separation unit is configured to receive liquid fuel from the fuel tank.

A method of gas inerting includes receiving a gas stream into a carbon dioxide separation unit from a catalytic oxidation unit, decreasing an amount of carbon dioxide in the gas stream, and providing a nitrogen enriched inerted gas stream to an inerting location.

Decreasing the amount of carbon dioxide in the gas stream includes creating a partial pressure gradient across a membrane.

Decreasing the amount of carbon dioxide in the gas stream includes using a carbon dioxide separation unit selected from the group consisting of a pressure-swing adsorption system, a temperature-swing adsorption system, and combinations thereof.

The method where the inerting location is a fuel tank.

The method where the inerting location is a cargo hold.

The method where the membrane is formed of a at least one material selected from the group consisting of polyether-polyamide block copolymer (PEBAX), polyphenylene oxide (PPO), polyimide, polydimethylphenylene oxide, polysulfone, polyethersulfone, poly(4-vinylpyridine)/polyetherimide, polyacrylonitrile with poly(ethylene glycol), poly(amide-6-b-ethylene oxide), poly-vinilydene fluoride (PVDF), and mixtures thereof.

The invention claimed is:

1. A gas inerting system for supplying an inerting gas stream to an inerting location of an aircraft, the gas inerting system comprising:
a fuel tank;
a fuel separation unit configured to receive fuel vapor and liquid fuel from the fuel tank and form a concentrated fuel vapor;
a catalytic oxidation unit downstream of the fuel separation unit, configured to receive the concentrated fuel vapor from the fuel separation unit, combust the received concentrated fuel vapor to reduce an amount of oxygen, and form an oxygen depleted gas stream;
a carbon dioxide separation unit comprising a membrane, the carbon dioxide separation unit located downstream of the catalytic oxidation unit and configured to receive the oxygen depleted gas stream from the catalytic oxidation unit, wherein the carbon dioxide separation unit increases an amount of nitrogen and reduces an amount of carbon dioxide and water in the oxygen depleted gas stream and forms the inerting gas stream; and
a gas flow path for the inerting gas stream from the carbon dioxide separation unit to the inerting location.

2. The system of claim 1, wherein the membrane has a configuration selected from the group consisting of planar geometry, spiral wound, hollow fiber, and combinations thereof.

3. The system of claim 1, wherein the membrane is formed of at least one material selected from the group consisting of polyether-polyamide block copolymer (PEBAX), polyphenylene oxide (PPO), polyimide, polydimethylphenylene oxide, polysulfone, polyethersulfone, poly(4-vinylpyridine)/polyetherimide, polyacrylonitrile with poly (ethylene glycol), poly(amide-6-b-ethylene oxide), poly-vinilydene fluoride (PVDF), and mixtures thereof.

4. The system of claim 1, wherein the carbon dioxide separation unit further comprises a partial pressure differential source in flow communication with the membrane.

5. The system of claim 4, wherein the partial pressure differential source is a vacuum pump.

6. The system of claim 4, wherein the partial pressure differential source is an ejector.

7. The system of claim 4, wherein the partial pressure differential source is a sweep gas.

8. The system of claim 1, wherein the inerting location is the fuel tank.

9. The system of claim 1, wherein the inerting location is a cargo hold.

10. A method for supplying an inerting gas stream to an inerting location of an aircraft, the method comprising:
receiving a fuel vapor and liquid fuel from a fuel tank into a fuel separation unit and forming a concentrated fuel vapor;
delivering the concentrated fuel vapor from the fuel separation unit to a catalytic oxidation unit and forming an oxygen depleted gas stream;

receiving the oxygen depleted gas stream into a carbon dioxide separation unit comprising a membrane from the catalytic oxidation unit;

decreasing an amount of carbon dioxide and water in the oxygen depleted gas stream by the membrane and forming the inerting gas stream, wherein the inerting gas stream is a nitrogen enriched inerting gas stream; and providing the inerting gas stream to the inerting location.

11. The method of claim 10, wherein decreasing the amount of carbon dioxide and water in the oxygen depleted gas stream further comprises creating a partial pressure gradient across the membrane.

12. The method of claim 11, wherein the membrane is formed of at least one material selected from the group consisting of polyether-polyamide block copolymer (PEBAX), polyphenylene oxide (PPO), polyimide, polydimethylphenylene oxide, poly sulfone, polyethersulfone, poly(4-vinylpyridine)/polyetherimide, polyacrylonitrile with poly(ethylene glycol), poly(amide-6-b-ethylene oxide), polyvinylidene fluoride (PVDF), and mixtures thereof.

13. The method of claim 10, wherein the inerting location is a fuel tank.

14. The method of claim 10, wherein the inerting location is a cargo hold.

* * * * *